June 28, 1966  P. P. RUMINSKY  3,258,042
SCREW STRIP DRIVING GUN
Filed Aug. 24, 1964  2 Sheets-Sheet 1

INVENTOR
PAUL P. RUMINSKY

BY Semmes & Semmes
ATTORNEYS

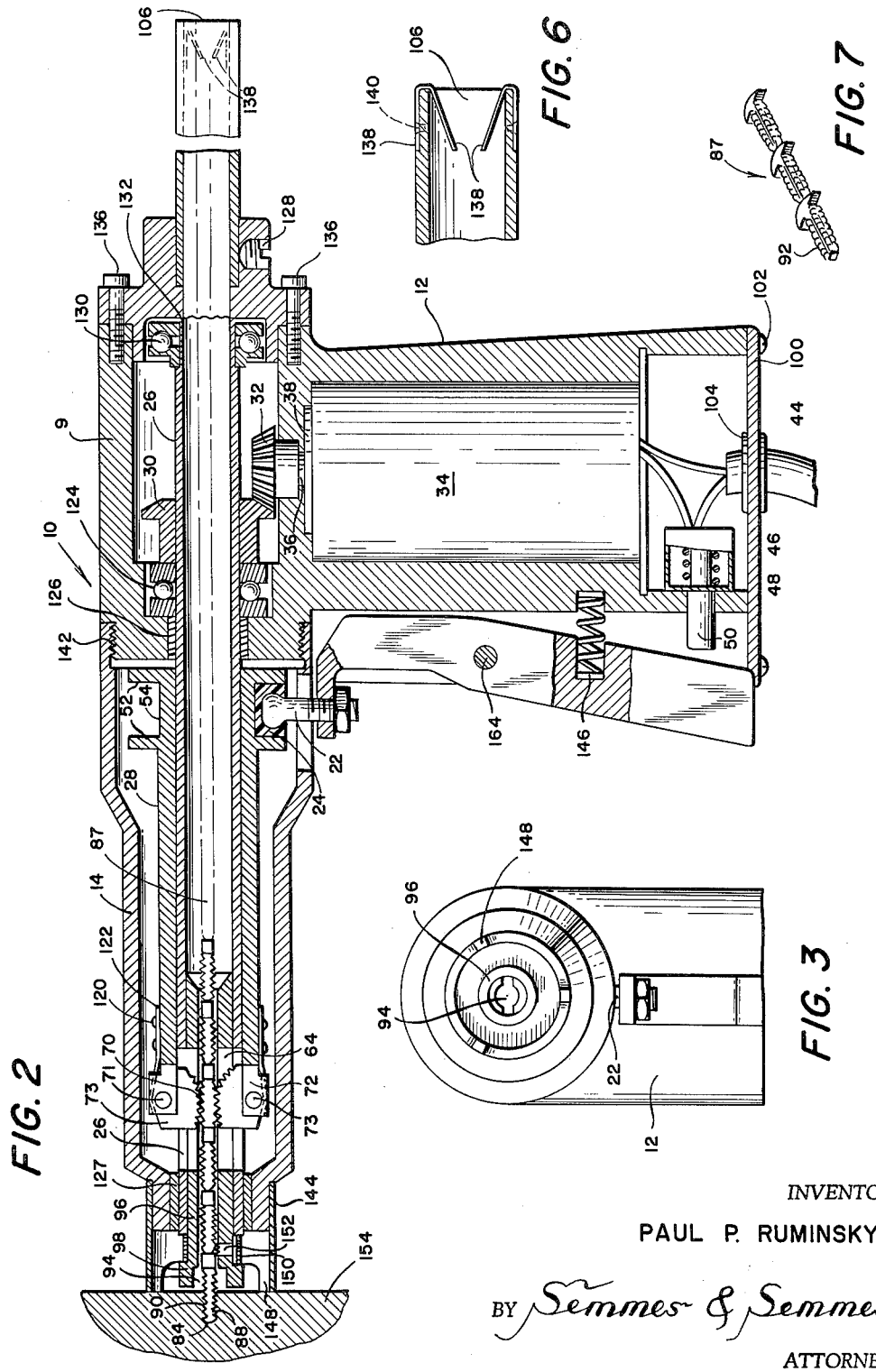

United States Patent Office 3,258,042
Patented June 28, 1966

3,258,042
SCREW STRIP DRIVING GUN
Paul P. Ruminsky, Amherst, Ohio, assignor of one-half to Herbert C. Brauchla, Fremont, Ohio
Filed Aug. 24, 1964, Ser. No. 391,547
8 Claims. (Cl. 144—32)

The present application relates to a screw strip driving gun, particularly a gun for driving screw strips of the type disclosed in applicant's Patent No. 3,127,625 entitled, Method for Forming Screws, issued April 7, 1964.

The present application is a continuation-in-part of applicant's application Serial No. 263,025, filed March 5, 1963, and entitled, Method for Driving Screws.

In the parent application there was disclosed a method, as well as a gun for driving screw strips, that is a plurality of screw elements integrally formed in end to end relationship as a strip of screws. Numerous previous inventors have devised screw strip guns, notably 2,247,500; 2,506,835; 3,034,548 and 2,575,525. The problem attacked by most inventors has been the advancement rotatably of a screw strip in order to shear the lead screw while insuring that the act of penetration of the lead screw and shearing does not interfere with the sequential feeding or advancement of the succeeding screw strip. Various complex screw strip feeding and screw strip holding mechanisms have been attempted with lack of marked success. A principal difficulty encountered in such feeding and holding mechanisms is attributed to the centrifugal force inherently developed in rotatable driving of the screw strip. This centrifugal force actually works against the screw strip locking and retaining mechanisms. Applicant has overcome the effects of centrifugal force by a unique screw strip feeding and retaining or locking means, principally a pair of eccentrically mounted cams the locking force of which is increased the farther the screw strip is longitudinally advanced.

Accordingly, it is an object of invention to provide an improved and simplified screw strip driving gun.

Another object of invention is to provide a screw strip driving gun having positive feeding and retaining forces unaffected by centrifugal forces.

Yet, additional objects of invention will become apparent from the ensuing specifications and attached drawings wherein:

FIG. 2 is a vertical cross-section of the screwdriving gun;

FIG. 3 is an end elevation thereof partially in section;

FIG. 6 is a enlarged vertical cross-section of the muzzle or feeding end of the screwdriving gun;

Figure 1:
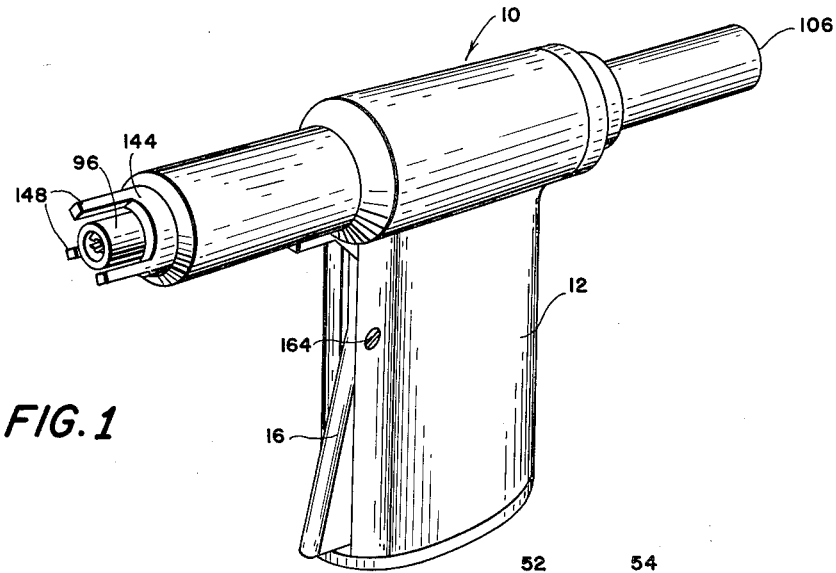
FIG. 1 is a perspective of a screwdriving gun having support legs mounted at its screwdriving end.
Figure 4:
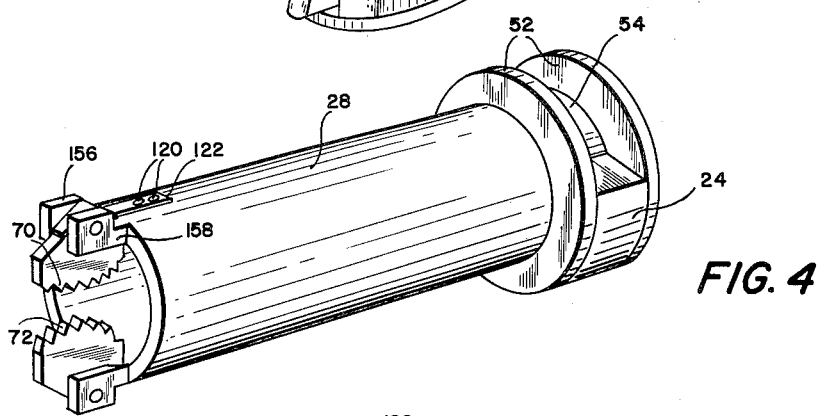
FIG. 4 is an enlarged perspective of the locking barrel with its forward eccentrically mounted cam-shaped locking jaws 70 and 72.
Figure 5:
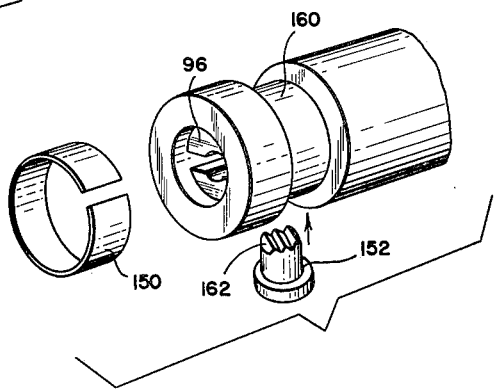
FIG. 5 is a enlarged perspective of the screwdriving end showing the key piece and resiliently mounted dog insertable therein.

FIG. 7 is a fragmentary perspective showing a screw strip of individual screws 87 having shank 90, head 88 and threads 92; screws 87 being integrated in end to end relationship as disclosed in applicant's Patent 3,127,625.

In FIG. 2 screwdriving gun 10 is illustrated as comprising housing 9 which may be molded integrally with handle 12. Housing 9 is attached by threads 142 to screwdriving forward end 14 through which extends rotatable barrel 26. Rotatable barrel 26 has a screw strip entry port or muzzle 106 and a screwdriving end keyhole piece 96 supported inwardly of barrel 26. Barrel 26 has upper and lower opposed longitudinal slots 62 and 64 and is rotated by means of motor 34, which may be electrically powered through power cable 44 in order to drive shaft 36 supported in bushing 38. End plate 100 containing power cable bushing 104 may be mounted in handle 12 by means of screws 102. Miter gear 32 attached to the end of shaft 36 engages gear 30 which is secured about rotatable barrel 26. A micro limit switch 46 embodying coil spring 48 and push trip 50 may be employed to turn motor 34 on and off, as trigger 16 is pivoted or squeezed inwardly upon pin 17 and against compression spring 146. Locking sleeve 28 is supported about barrel 26 and includes at its forward end cam-shaped locking jaws 70 and 72 eccentrically mounted upon pins 71 and 73 between blocks 156 and 158. A flat spring 122 may be secured with one end upon barrel 26 by means of screws 120 and the other end engaging the base of the cam so as to urge it radially inwardly towards the screw strip. As will be noted, jaws 70 and 72 are shaped such that as sleeve 28 is advanced axially longitudinally towards the screwdriving end of rotatable barrel 26, jaws 70 and 72 bear down with increasing locking force upon the screw strip as teeth 73 engage threads 92 in the individual screws 87. This cam effect overcomes the inherent centrifugal force urging outwardly locking teeth 70 and 72 from the screw strip. Teeth 73 may be angled forwardly to assist in axially advancing the screw strip towards the screwdriving end.

At the muzzle end of sleeve 28 flanges 52 define track 54 in which is movably fitted "Teflon" or like slip collar 24. Collar 24 in turn is attached to actuator bolt 22 which is threaded in the top of trigger 16.

Barrel 26 is rotatably supported within the housing by means of bearing rings 124 and 130 as well as bushing members 126 and 127. Muzzle 106 may be secured in the housing by means of a set screw 128 or the like and may include inwardly disposed clips 138 which may be mounted thereon by means of screws 140.

In operation, as trigger 16 is closed against gun handle 12 micro limit switch 50 is tripped causing barrel 26 to rotate and simultaneously locking sleeve 28 is axially advanced. Jaws 70 and 72 thus are pivoted onto the screw strip while axially advancing the screw strip so that lead screw tip 84 is presented against surface 154 in which the screw is to be driven. The locking of jaws 70 and 72 into screw threads 92 and the encompassment of keyhole piece 96 about the screw strip induce rotation of the entire screw strip, the individual screw tip 84 and shank 90 working itself by rotation into the surface to be penetrated. This operation is enhanced by the support legs 148 mounted upon piece 144 secured to the housing portion 14. As the screw head 88 contacts surface 154 being penetrated, the individual screw is sheared at point 94 from the succeeding screw. Trigger 16 may then be released with the result that motor 34 is stopped, barrel 26 ceases rotating and spring 146 pivots trigger 16 to urge sleeve 28 to slide reversely towards muzzle 106. In reverse axial motion jaws 70 and 72 strip over the screw threads 92 while split spring 150 locks dog 152, teeth 162 into the screw strip so as to prevent reverse axial movement. Also reverse axial movement is prevented by inwardly extending clips which provide a measure of vertical support of the clip within the gun.

According to the present invention barrel 26 is rotated and the screw strip axially advanced only upon squeezing or pivoting of trigger 16 against gun handle 12. This arrangement enables utilizing the support legs 148 as a pushing surface. Since the screw drives itself once tip 84 enters the surface to be penetrated, only a very slight pressure is required to initiate driving of the screw. It is estimated that strip screws of 25 to 30 screws each may be secured within the gun and the barrel may be rotated at speeds as low as 600 r.p.m. and as high as 2600 r.p.m. The shear point of individual screws may be determined by the speed of rotation, as well as the construction of the screw itself, shear points being made to various strengths for various industrial purposes. It is contemplated also that voltage controls may be employed to vary the motor speed and barrel rotation. Pneumatic or hydraulic means may also be employed to rotate the barrel and variously configured guide piece keyways may be provided to fit various screw lengths and configuration. According to the present method there have been driven No. 6–32 screws, formed from 3/32 by 1/4 inch stock and having 32 threads per inch.

Manifestly, various modifications in the proposed gun structure may be employed without departing from the spirit and scope of invention, as defined in the subjoined claims.

I claim:
1. A screw strip driving gun of the type having a housing and handle attached thereto, comprising:
   (A) a rotatable barrel extending through said housing, and having a screwdriving end and a screw strip receiving muzzle;
   (B) a driving means supported in said housing and engaging said rotatable barrel;
   (C) screw guide means mounted at the driving end of said barrel and axially supporting a screw strip of threaded screws in end to end relationship within said barrel;
   (D) an axially reciprocable locking sleeve supported about a median portion of said rotatable barrel and including at its forward end a pair of pivoted threaded cams radially extensible through the top and bottom of said rotatable barrel so as to engage and lock upon threads of said screw upon axial advancement of said locking sleeve; and
   (E) trigger means pivoted in said housing and engaging said locking sleeve which is axially advanceable upon pivoting of said trigger.

2. A screw strip driving gun as in claim 1, including reverse locking means radially extensible through the screwdriving end of said barrel against said screw strip so as to prevent reverse axial movement of said screw strip upon reverse axial movement of said locking barrel.

3. A screw strip driving gun as in claim 2, including spring means supported upon said locking sleeve and against said cams so as to urge said cams to engage and lock upon said screw strip.

4. A screw strip driving gun as in claim 3, said screw guide means having at the screwdriving end of said barrel a keyhole lock piece equivalent in axial configuration to the vertical sectional profile of said screw strip.

5. A screw strip driving gun as in claim 4, including leg support means extending from the screwdriving end of said housing parallel with said screw strip.

6. A screw strip driving gun as in claim 5, including a radially inwardly extending dog spring-positioned in said screw guide means and lockable with said screw strip so as to inhibit reverse axial movement of said screw strip.

7. A screw strip driving gun as in claim 6, said locking sleeve cams being eccentrically mounted and shaped so as to engage with the threads of said screw strip and pinch same upon axial advancement of said locking sleeve.

8. A screw strip driving gun as in claim 7, including at least one reverse locking strip extending inwardly of said receiving muzzle and engaging said screw strip both as a vertical support and a lock against reverse axial movement of said strip.

No references cited.

WILLIAM W. DYER, JR., *Primary Examiner.*

R. J. ZLOTNIK, *Assistant Examiner.*